J. R. & E. C. WINTER.
NUT.
APPLICATION FILED DEC. 5, 1907.

899,368.

Patented Sept. 22, 1908.

John R. Winter
Edwin C. Winter
Inventors

Witnesses

By
Attorneys of a hexagonal nut constructed according to

UNITED STATES PATENT OFFICE.

JOHN R. WINTER AND EDWIN C. WINTER, OF DETROIT, MICHIGAN.

NUT.

No. 899,368.  Specification of Letters Patent.  Patented Sept. 22, 1908.

Application filed December 5, 1907. Serial No. 405,269.

*To all whom it may concern:*

Be it known that we, JOHN R. WINTER and EDWIN C. WINTER, citizens of the United States, residing at Detroit, in the county of Wayne and State of Michigan, have invented certain new and useful Improvements in Nuts, of which the following is a specification.

This invention relates to nuts and the like, and comprises broadly a sheet metal nut stamped and drawn into proper shape by means of suitable dies, and has for its object to provide a satisfactory nut which can be made at a small cost from sheet metal instead of from the bar metal usually employed for that purpose. This will result in a considerable saving of metal, which is a matter of considerable importance in nuts made of brass and other high priced metals.

The nuts may be made in any shape desired, that is, either round, square, hexagonal, or otherwise, and the invention is not limited to the particular shape and construction shown in the accompanying drawings, in which one form of the invention is illustrated.

Figure 1:
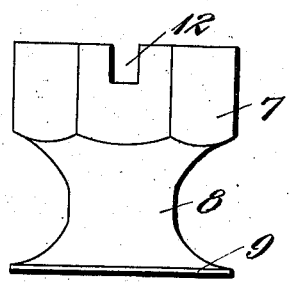
Figure 3:
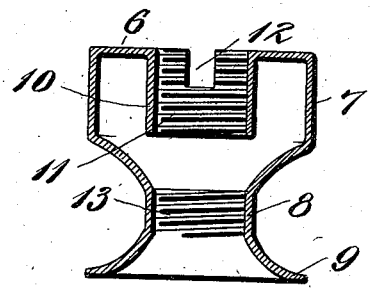
Figure 2:
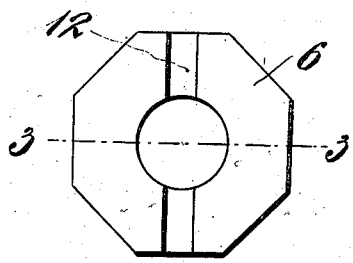
Figure 4:
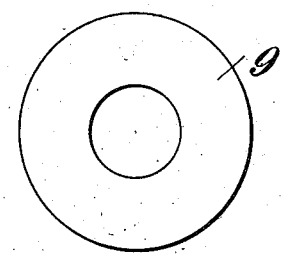

In the drawings, Figure 1 is a side elevation of a hexagonal nut constructed according to the invention, this particular type being a nut particularly used for binding posts or screws. Fig. 2 is a top plan view. Fig. 3 is a section on the line 3—3 of Fig. 2. Fig. 4 is a bottom plan view.

The nut shown herein is produced by several operations from a flat blank which is cut, punched, and shaped by special dies to the form shown and described herein. The method of construction may be so far explained as to say that a circular blank is first cupped, the head is punched and the edges turned in to form a central tube, after which the sides are pressed in to form a neck, and the parts are then threaded internally to take the bolt or screw.

When completed the nut forms a hollow structure having a head 6, sides 7, a neck 8 and a flared base 9. The head is punched, as stated, and the edges turned in to form a tube 10 which is internally threaded, as indicated at 11, and a kerf 12 is stamped in the head, extending diametrically across the same. The sides 7 are pressed to the desired shape, and the neck 8 is pressed in so that its inner diameter is substantially equal to the diameter of the tube 10, and said inner surface is threaded as indicated at 13, forming, in effect, a part of the threaded bore of the nut. The base 9 is spread to about the same diameter as the head and binds against the work or surface to which the nut is applied, the bolt or screw being engaged by the threads 11 and 13 within the nut. A nut so formed, or otherwise formed within the scope of the invention, will have sufficient strength to stand any ordinary strain, even when constructed of comparatively thin metal.

We claim:

1. A nut made of sheet metal, having a hollow body the sides of which are contracted near the base, forming a neck, which is internally threaded.

2. A nut made of one piece of sheet metal, shaped to form a hollow body, and having upper and lower internally threaded tubes in line with each other.

3. A nut made of sheet metal, comprising a hollow body with a head having a threaded tube projecting inwardly therefrom, a contracted internally-threaded neck below said tube, and a flared base at the bottom.

In testimony whereof we affix our signatures, in presence of two witnesses.

JOHN R. WINTER.
EDWIN C. WINTER.

Witnesses:
KATE ROBERTSON,
CORA E. HEMPEL.